Aug. 9, 1966  W. D. NOVAK  3,264,736

COMPASS

Filed Oct. 14, 1963  2 Sheets-Sheet 1

INVENTOR
WARREN D. NOVAK

BY *Curtis Ailes*
ATTORNEY

Aug. 9, 1966      W. D. NOVAK      3,264,736

COMPASS

Filed Oct. 14, 1963      2 Sheets-Sheet 2

United States Patent Office 3,264,736
Patented August 9, 1966

3,264,736
COMPASS
Warren D. Novak, New Castle, N.Y.
(325 Douglas Road, Chappaqua, N.Y.)
Filed Oct. 14, 1963, Ser. No. 315,862
12 Claims. (Cl. 33—27)

This invention relates to measuring and drafting and layout instruments, and particularly to instruments which are adapted for drawing circles and arcs of circles of accurately determined size very rapidly and efficiently.

In the past, many attempts have been made to simplify the procedures for making circles in engineering drawings and layout work by making compasses which have direct reading features so that the compass may be set directly to the size of circle which is desired, without employing a separate scale for the setting operation. For instance, in even the most inexpensive schoolboy's compass there is generally provided a segmented scale for the purpose of providing an indication of the dimension of the circle which the compass is set to make. However, this scale is never particularly accurate and it gives only an approximation of the actual size of the circle which is to be produced. This is due not only to the crude and inexpensive construction of the device, but also to the fact that the arrangement of the segmented scale is such that the indication of the circle size is given on an actual dimension which is much smaller than the dimension between the outer points of the compass, because the scale is arranged intermediate between the compass pivot and the compass points.

Various attempts have been made to provide more elaborate direct reading compasses. Many such attempts are illustrated in various United States patents such as U.S. Patent 2,324,041—Suverkrop. However, despite the fact that the Suverkrop patent was issued twenty years ago, professional draftsmen, and others who must lay out circles with extreme accuracy have continued with their ancient circle drawing procedures. These include the step of setting the two points of the compass or dividers on a separate drafting scale to set the distance between the two points. This method is difficult and inaccurate and involves considerable eyestrain. An aggravating factor is that a radius is being measured and any error is doubled in the diameter of the resultant circle. Furthermore, if extreme accuracy is required, it is often necessary to follow the further steps of drawing trial circles, and then measuring the trial circles to further verify the accuracy of the dimension.

Apparently these archaic customs of the professional draftsman have been continued because previous attempts at producing direct reading precision compasses have been failures. These failures are believed to have resulted because the prior instruments were too clumsy, awkward, and heavy.

At the present time, most of the pieces in a set of professional engineering drafting instruments are concerned with the purposes of transferring measurements and drawing arcs and circles of various sizes. A full set of drafting instruments may include, for instance, a "drop" compass which is particularly useful for drawing very small circles, a "bow" compass which is useful for drawing somewhat larger circles which may have a radius up to one inch or so, a friction locking compass, having a friction lock at the pivot point, which may be used effectively for circles up to 3 or 4 inches in radius. With extension legs, the last-mentioned compass may be used for circles having a radius of up to 8 inches or more. Finally, a special apparatus referred to as a "beam" compass may be included in which the pivot point device and the marking device are fastened to a beam and which is useful for circles larger than those mentioned above.

Compasses of all of the various types mentioned above may be constructed for operation with pencil leads, or may incorporate inking pens. In some instances, interchangeable pencil heads or inking heads may be provided for making the circular marks. Usually, the only piece in the drawing instrument set which is not concerned with the need for transferring dimensions or drawing circles is a ruling pen. The number of different instruments required in present drawing instrument sets make the sets quite expensive. But a more important consideration is that when the user requires circles in a broad range of sizes, there is a considerable loss in time and motion in shifting from the use of one instrument for one range of circle sizes, to another instrument for another range of circle sizes and so on.

Accordingly, it is one important object of the present invention to increase the speed and efficiency of drafting operations.

It is another object of the invention to reduce the cost and complexity of drafting instrument sets by providing a single compass instrument which practically satisfies the requirements of an entire set of drafting instruments. Thus, shifting from one instrument to another for different circle size ranges is unnecessary.

Another problem with present drafting instruments, and particularly with the most common variety of compasses and dividers, is the inaccuracy of setting which results from the use of a simple friction lock at the pivot of the compass or divider for holding a setting. If the friction lock is very tight, then it is difficult to set and results in excessive wear at the pivot. On the other hand, if the friction lock is too loose, then the setting cannot be accurately maintained to transfer dimensions or to draw an accurate circle in which the ends of the circular line flow neatly together. Furthermore, if extension legs are employed to increase the circle radius capacity of the friction lock compass, then additional sources of inaccuracy arise from the "play," or lost motion which is often encountered in the points of the extension connections.

Accordingly, it is another object of the present invention to provide a compass which is much more accurate in setting and which holds the dimension to which it is set with great accuracy.

It is another object of the invention to provide a compass which is not only accurate and positive in holding a dimension to which it is set, but also to provide a compass which is very rapidly adjustable to a desired new setting.

Another object of the present invention is to provide an improved compass which does not result in loss of time required for recalibration or resetting of the compass after the compass pencil lead has been sharpened.

Another object of the present invention is to provide an improved direct reading compass which is particularly characterized by the ease with which calibration of the direct reading scale may be accomplished or verified.

Another object of the present invention is to provide an improved compass structure which is light in weight and which is particularly notable for lack of unnecessary bulkiness.

While all of the objects and advantages of this invention are important, the broadest object and advantage of the invention, which relates to all of the others, is that of improving the speed and efficiency of the draftsman in the production of circles and arcs of circles of various sizes. As will appear below, this improvement in speed is accomplished by virtue of a number of different features of the invention, including the direct reading feature whereby reference to a separate straight scale is unnecessary, the feature of the utility of the instrument in place of almost an entire set of conventional drafting instruments, and improved efficiency by virtue of the positive locking feature to assure a continuation of a desired adjustment.

In carrying out the above objects of the invention in one preferred embodiment thereof, there is provided a compass having a body member and a gear rack member mounted for adjustment movement within the body member and protuding theerfrom. A pinion gear is mounted within the body member and in engagement with the gear rack for controlling the adjustment movement thereof. Each of the members includes an arm with an adjustable pointed mmeber supported thereon. An adjustment wheel is provided having an outside diameter greater than the diameter of the pinion and affixedly mounted upon a common shaft with the pinion for adjustment of the pinion.

Further objects and advantages of the invention will be apparent from the following description and the accompanying drawings which are briefly described as follows.

Figure 9:
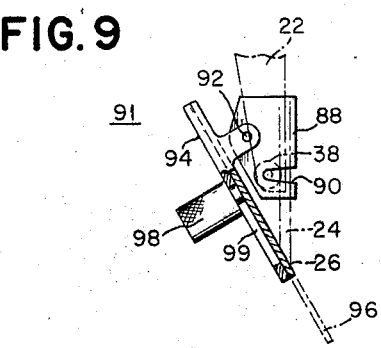

And FIG. 9 is a side view of a precision sharpening device for sharpening the pencil lead of the compass in such a way that the adjustment thereof is not destroyed by the sharpening.

Figure 5:
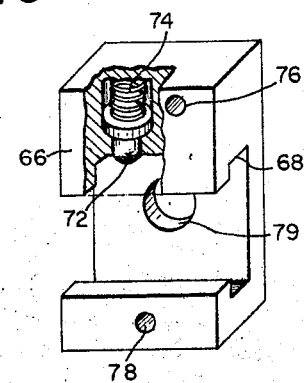
FIG. 5 is a perspective view of an auxiliary body member which is arranged to mount and guide a trammel bar and partially cut away to show a detent locking cam for engagement with detents in the trammel bar.
Figure 4:
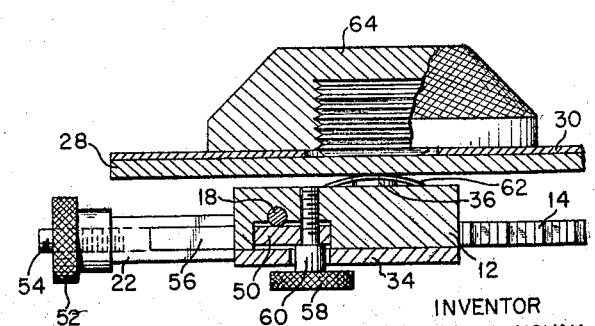
FIG. 4 is a top view of the embodiment of FIG. 1 with certain portions broken away and in which the body member is sectioned through the plane marked at "4—4" in FIG. 2.
Figure 8:
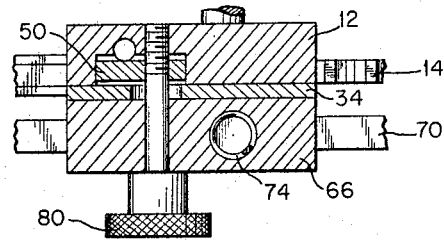
FIG. 8 is an enlarged partial sectional top view showing details of the body member and the auxiliary body member.

All of the drawings are shown to a scale which is slightly larger than actual size, and FIGURES 4, 5 and 8 are enlarged even more to show the details more clearly.

Figure 1:
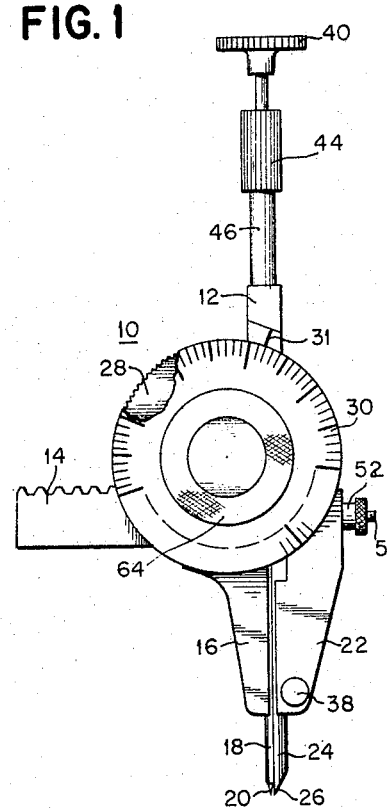
FIG. 1 is a front view of a preferred embodiment of the compass of this invention with a small portion of the dial disc broken away to show the pinion adjustment wheel behind the dial disc.

Referring particularly to FIG. 1, there is shown a compass 10 having a body member 12 and a gear rack member 14 which is mounted for movement with respect to the body member 12. The body member 12 includes an arm 16 which carries a pin 18 having a point indicated at 20. Similarly, the rack member 14 includes an arm 22 which may be provided with a pencil lead 24 having a point as indicated at 26. An adjustment wheel 28 is provided which is rotatable to adjust the position of the rack 14 with respect to the body member 12. This is accomplished by means of a pinion gear 32 shown in FIG. 2. A dial disc 30 is provided for rotation with wheel 28 to indicate the position thereof by reference to a mark 31 on body 12.

Figure 2:
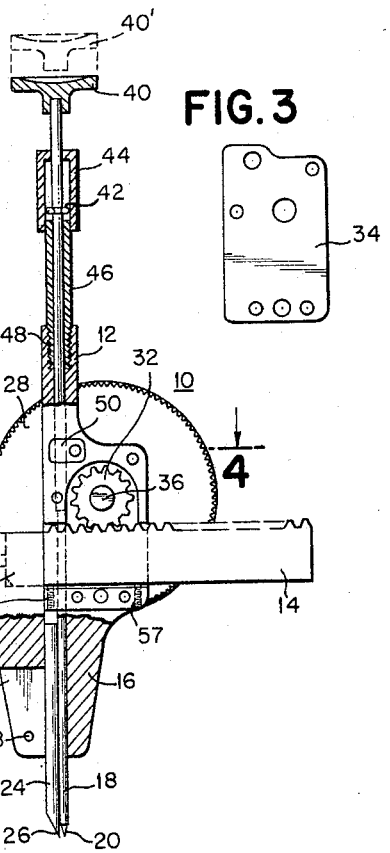
FIG. 2 is a rear view of the compass of FIG. 1 shown partly in section with the rear cover plate of the body of the compass removed to reveal the rack and pinion and other structural details.
Figure 3:
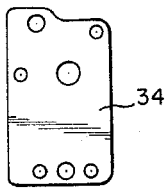
FIG. 3 is a front view of the cover plate which was removed from the body member of FIG. 2.

FIG. 2 is a rear view of the compass of FIG. 1, shown partly in section, and with the cover plate 34 of FIG. 3 removed. The pinion 32 is mounted on a common shaft 36 with the adjustment wheel 28, and accordingly, a movement of the wheel 28 is transmitted to the pinion 32 and thus is translated into an adjusting movement of the rack 14. This determines the separation between the points 20 and 26 and thus determines the dimension to be measured or marked off between these points, or it determines the radius of the circle which may be drawn by rotation of the compass about the point 20 to make a circular mark by the point 26.

The pin 18 and the lead 24 may be each referred to below as pointed members. These pointed members 18 and 24 are adjustable within the respective arms 16 and 22. For instance, the lead 24 is clamped within a slotted opening in the arm 22 by means of a knurled thumbscrew 38. It is one of the interesting and useful features of this invention that the slotted opening for the lead 24 is quite long so that a long piece of lead may be placed in the instrument and very infrequent replacement of the lead is necessary.

The pin 18 extends all the way through the body 12 and terminates at the top of the instrument in a finger-button 40 which may be permanently fastened in any suitable manner such as press-fitting on the end of the pin 18. The pin 18 is normaly reciprocably moveable within the body 12 of the instrument, as indicated by the dotted position 40' for the button 40. The extent of this movement, which may be described as that of a "lost motion" connection, is determined by a small collar 42 which forms a part of the pin 18 and which is confined within a chamber of restricted axial length which is defined by a cap member 44 and a sleeve member 46 which are press-fitted together. Cap member 44 preferably has a knurled outer surface for ease of rotation of the body member 12. The sleeve member 46 is removably fastened by threads indicated at 48, to the body member 12. Because of the lost motion connection between pin 18 and the body 12, the compass is operable as a "drop" compass in the well-known manner such that the index finger is normally placed on the top of the buton 40 and the cap member 44 is grasped between the thumb and the second finger. The user then engages the point 20 with the drawing and allows the body of the compass to drop by sliding down on the pin 18 till the point 26 of the lead 24 engages with the drawing. The body is then rotated about the pin 18 by rolling the cap member 44 between the fingers.

When the compass is to be opened to a larger dimension, such as for three quarter inch diameter circles or larger, the "drop" compass feature is not desired. In this instance, the pin 18 may be locked to discontinue the "drop" feature by means of a locking plate 50, the operation of which is described in more detail by reference to FIG. 4 below. The arm 22 may be removably fastened to the rack 14 by means of a threaded nut 52 which is threaded over a small extension 54 of the rack 14 which is provided with screw threads for this purpose. Thus, the arm 22 can be removed and replaced by a similar arm which carries a different kind of pointed member such as an inking pen, or a simple steel point for measuring or scribing purposes. The arm 22 is perfectly and precisely positioned upon the rack 14 by reason of the fact that the unreduced end of the rack, as indicated at 56, nests into a slot in the edge of the arm 22, and bottoms in that slot when the nut 52 is tightened. These features are also shown in FIG. 4.

In order to assure a snug fit between the rack 14 and the pinion 32, and to prevent any substantial lost motion in the engagement therebetween, two small guide screws 57 are arranged within suitable threaded openings in the body 12 to bear against the bottom surface of the rack 14. These guide screws 57 may be as small as 0–90, but they are quite effective in preventing any lost motion and in preventing any possibility of a substantial rocking motion of the rack 14. The guide screws 57 may be periodically adjusted in order to compensate for wear between the rack 14 and pinion 32. Brass is the preferred material for these screws when the rack is steel.

FIG. 4 is an enlarged partial top view of the embodiment of FIG. 1 with certain portions broken away and sectioned in order to reveal details of the structure. In particular, the body 12 is shown sectioned in FIG. 4 at the section line indicated at "4—4" in FIG. 2. In this top view, the positioning of the end of the rack 14 at 56 in the slotted opening in the arm 22 is clearly shown. This figure also shows the manner in which the plate 50 locks the pin 18 when this locking action is desired. This is accomplished by means of a knurled screw 58 having a shoulder 60 which fits through an enlarged hole in the cover plate 34 to engage and tighten down upon the plate 50. The screw 58 fits through a clearance hole in the plate 50 and is threadedly engaged in the portion of the body member 12 beyond the plate 50. The locking plate 50 is fitted into a precisely shaped depression in the body member 12 so that it is freely movable therein but securely retained therein when the cover plate 34 is in place. The bottom of this depression for the locking plate 50 exposes only a few thousandths of an inch of the diameter of the pin 18. Stated another way, when the locking plate 50 engages the pin 18, it is only a few thousandths of an inch from the bottom of the recess in the body member 12 which contains the locking plate 50. As shown in FIG. 4, when the locking plate 50 is tightened so as to lock the pin 18, it is free to rotate slightly within its enclosure until the right end engages the bottom of the enclosure. It thus forms the fulcrum for the operation of the locking plate 50 as a locking lever.

A constant friction locking action for the adjustment wheel 28 is provided by means of a dished spring metal washer 62 which is arranged upon the shaft 36 of the pinion gear 32 between the body member 12 and the adjustment wheel 28 as shown in FIG. 4. From the drawing it is clear that washer 62 has an effective radius of contact which is at least in the order of the radius of the pinion gear 32.

The dial disc 30 is normally locked in place against the adjustment wheel 28 by means of a knurled locking nut 64 which is threadedly engaged upon the central hub of the adjustment wheel 28. When these 3 parts are locked together, they normally rotate together as the instrument is adjusted for different settings between the points. However, for accurate calibration of the instrument, the nut 64 may be loosened, and the dial disc 30 may be rotated with respect to the wheel 28 until the correct adjustment is achieved, after which the dial disc may again be locked to the wheel 28 by tightening the nut 64. The dial disc 30 then provides a direct reading which is indicative of the separation between the points 20 and 26 by reference to the index mark 31 on the body 12. Preferably the dial 30 provides a true reading of the separation between points 20 and 26. However, it is quite clear that the dial 30 may be calibrated to indicate double the distance between points 20 and 26 so as to indicate the diameter of the circle which the compass instrument will produce, if this is desired. It is clear also that various arrangements of the scale upon the dial disc 30 may be employed. For instance, the scale may read in fractions of an inch, or decimal fractions of an inch. Also, the dial may be calibrated in the metric system. Furthermore, by removing the lock nut 64, the dial disc 30 may be easily replaced by the user if it becomes worn, or interchanged at will with a different dial disc 30 having one of the other scales.

FIG. 5 is an enlarged detail perspective view of an auxiliary body member 66 which is designed to be assembled to the back of the main body member 12 over the cover plate 34. This auxiliary body member 66 contains a slotted opening 68 for the purpose of receiving a trammel bar of rectangular cross section. The assembly including the trammel bar is shown in greater detail in FIGS. 6, 7, and 8, in which the trammel bar is identified at 70. The trammel bar 70 is provided with a precision detent or notch at the upper edge thereof at every inch of its length. The auxiliary body member 66 is provided with a spring biased locking cam button 72 to engage the detent of the trammel 70 and thus to position the trammel 70 within the auxiliary body member 66. The button 72 is spring biased downwardly by means of spring 74 so that the locking action of the cam 72 is releasable whenever sufficient force is applied to effect such release. The auxiliary body member 66 is provided with two mounting screw openings, indicated at 76 and 78, by means of which the auxiliary body member is mounted to the back of the main body member 12 as will be described more fully below in connection with FIGS. 6, 7, and 8. Body member 66 is also provided with a center opening 79 to serve as a window through which a number on the trammel is visible at each setting to indicate the trammel extension.

Figure 6:
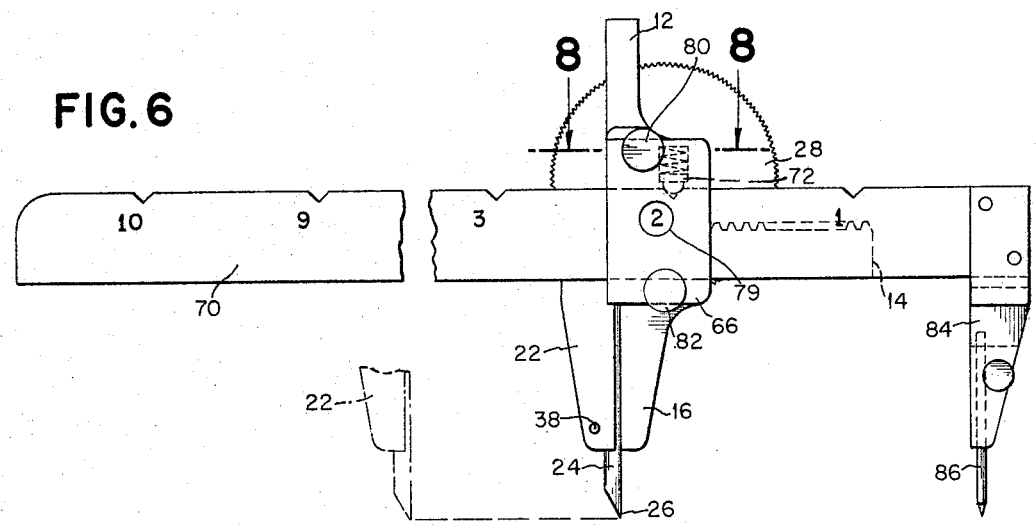
FIG. 6 is a rear view of the embodiment of FIG. 1, with the auxiliary body member and the trammel bar incorporated therewith for operation at greater dimensions.

FIG. 6 is a rear view of the instrument including the auxiliary body member and the trammel bar 70 assembled with the compass of FIGS. 1 and 2. The auxiliary body member 66 is held in place on the body member 12 by means of knurled thumb screws 80 and 82 which extend through the openings 76 and 78 in the auxiliary body member 66 and into threaded openings in the main body member 12. The screw 82 is inserted through the opening 78 in the auxiliary body member 66 and is threaded through a suitable hole provided in plate 34 and into the body member 12.

Figure 7:
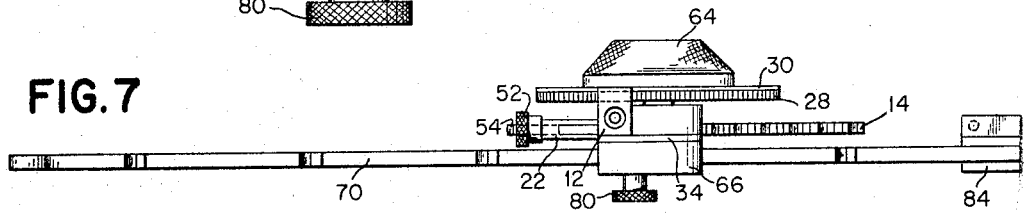
FIG. 7 is a top view of the compass including the trammel bar as shown in FIG. 6.

FIG. 7 is a top view of the complete assembly of the compass with the trammel bar 70 as shown in FIG. 6.

FIG. 8 is an enlarged detail top view of a portion of the assembled body members taken along the section "8—8" of FIG. 6. This section corresponds to the section "4—4" of body 12 shown in FIG. 4. The screw 80, which helps to mount and fasten the auxiliary body member 66, employs the same threaded opening in body member 12 as that employed for screw 58 as shown in FIG. 4. Screw 58 is removed when the auxiliary body 66 is employed. The shank of screw 80 freely passes through the mounting hole 76 in the auxiliary body member 66 as well as through the plate 34 and the locking plate 50, and it is threadedly fastened only to the body member 12 beyond the plate 50. The locking action of the plate 50 is not required when the trammel 70 is employed with the compass of this invention as is illustrated in FIGS. 6, 7, and 8. Since the pin 18 is not required, it is removed by unscrewing the sleeve 46, as shown in FIG. 2 at its threaded fastening 48 with the body 12 and completely removing the sleeve 46, together with the pin 18 and associated parts, from the body 12.

The pin 18 is not required when the trammel 70 is employed because the trammel 70 includes its own point carrying arm 84 which carries an adjustable point member 86, as shown in FIG. 6. Thus, the adjustment between the points 86 and 26 determines the setting of the instrument when the trammel is employed. The auxiliary body member 66 and the trammel 70 and the associated apparatus including the arm 84 may be considered as optional parts of the basic body member 12. It is intended in the preferred embodiment of this invention that the rack 14 will provide an adjustment of the point 26 over a range of one and one half to two inches. The length of the rack 14 is thus sufficient to provide a maximum total travel excursion for adjustment of the point 26 in the order of two inches, and this is approximately equal to the diameter of the wheel 28 and the dial disk 30. Without the trammel bar, then, the instrument is adjustable continuously over a range of from about twenty thousandths of an inch to about two inches in point separation. With the trammel bar, the adjustment of the rack 14 is added to the separation of the points afforded by the trammel. Thus, for point separation adjustments between 2.020 inches and 3.020 inches, the trammel bar is set at the 2 inch position and the adjustment within the one inch range between 2.02 inches and 3.02 inches is accomplished by movement of the rack 14 by adjustment of the wheel 28. The advantages of the combination of the direct reading adjustment of the rack through the adjustment wheel 28 and the quick choice of the one inch ranges for such adjustment by movement of the trammel bar 70 between the one inch detent notches are believed to be quite obvious. By means of this combination of features it is possible very rapidly to set the compass at any selected point separation dimension from about 1.02 inches up to any maximum dimension desired, depending upon the length of the trammel bar 70. While the trammel bar 70 has been shown as approximately 10 inches in length, it will be quite obvious that any length of trammel may be employed and that trammel bars of different lengths may be quickly substituted for one another to provide for different adjustments and different ranges of adjustment. It is also possible to obtain a point separation substantially greater than one inch by simply substituting a longer rack 14 instead of employing the trammel, but this alternative is not preferred.

As mentioned above, one of the features of this invention involves an alignment of each of the point carrying members in a direction which is perpendicular to the rack 14. With this geometry in arrangement of the point carrying members, vertical adjustments of the points cause virtually no modification or decalibration in the spacing between the points. This is particularly true when the instrument is used with the "drop" feature with the pin 18 freely movable. When the instrument is used for larger point separations with the pin 18 locked, or with the trammel bar 74 with even larger point separations, small vertical adjustments in the points are relatively unimportant because of the very slight difference in angle of the instrument which results. In order to maintain the full advantage of the point spacing determination of the point 26, for instance, due to the vertical alignment of the lead 24 in a perpendicular relationship to the rack 14, it is preferred to sharpen the lead 24 in a very accurately determined wedge shape as shown in the drawings. One of the important features of this invention involves the provision of a very simple but novel and effective means for providing an accurately determined wedge-shaped sharpening of the lead 24 and this feature is shown in FIG. 9.

FIG. 9 shows a feature of the invention including a fixture 91 for accurately sharpening the pencil lead 24 to reform the point 26 after it is worn. This fixture includes a U-shaped body member 88 which is accurately dimensioned to slide over and embrace the point carrying member 22 and which has slots 90 in both sides of the U to accommodate both ends of the lead clamping screw 38. By virtue of these slots 90 and the manner in which they cause the body member 88 to embrace the point carrying member 22 as well as the screw 38, it is positioned upon the point carrying member 22 in a position which is always precisely the same.

At 92, a sharpener guide member 94 is pivotally mounted to the body member 88, and a reciprocable sharpening member 96 is slidably mounted within the sharpener guide member 94. The sharpening member 96 is reciprocable in a generally up and down direction through a lost motion connection within the sharpener guide member 94 by means of a small handle 98 attached to the sharpening member and movable therewith. The handle 98 protrudes through a slotted opening shown at 99 in the sharpener guide member 94. The sharpening member 96 has an abrasive surface which is arranged to rest against the adjacent surface of the lead 24 so that as it is reciprocated by the movement of the handle 98, the lead 24 is sharpened at the point 26 by abrading away portions of the wedge surface of the lead 24. As additional lead is removed, the slight reduction in length of the lead 24 is accommodated for by rotation of the sharpener guide member 94 about the pivot 92 in a very slight degree. Thus, the wedge surface which is being sharpened remains substantially parallel from one sharpening to the next. Also, such change as there is (involving a rotation about the pivot 92), has substantially no effect upon the accuracy of the compass instrument. This is because the pivot 92 is perpendicular to the lead 24 and also perpendicular to the direction of the rack 14 and thus perpendicular to the direction of separation of the two points of the instrument.

It is believed to be obvious from the above description of the preferred embodiment of this invention that all of the objects and advantages of the invention enumerated at the beginning of the specification have been achieved. It is clear that this invention provides a very rapid and efficient means for producing circles of almost any desired size with a single instrument and without the necessity for reference to other scaling or measuring instruments. Actual tests of the invention have established this.

While this invention has been shown and described in connection with a particular preferred embodiment, various alterations and modifications will occur to those skilled in the art. Accordingly, the following claims are intended to define the valid scope of this invention over the prior art and to cover all changes and modifications falling within the true spirit and valid scope of the invention.

I claim:

1. A compass comprising a body member and a gear rack member mounted for straight line adjustment movement within said body member and protruding on each side thereof, said body member including guiding means for maintaining said gear rack member in alignment therein during said movement, a pinion gear mounted within said body member and in engagement with said gear rack for controlling the adjustment movement of said gear rack member, each of said members including an arm and an adjustable pointed member supported on each of said arms, said pointed members each being mutually parallel and perpendicular to the direction of movement of said rack member, an adjustment wheel having an outside diameter greater than the diameter of said pinion and fixedly mounted upon a common shaft with said pinion for adjustment of said pinion, a constant friction locking device comprising a dished spring washer positioned upon said shaft between said body member and said wheel, said spring having an effective radius of contact at least in the order of the radius of said pinion, said spring providing a friction force to restrain rotation of said wheel and said pinion to thereby prevent inadvertent movement of said rack in response to forces upon said rack alone, a graduated dial disk having a diameter substantially equal to the diameter of said wheel and adjustably positionable and arranged to be locked upon the face of said wheel to provide an accurate direct reading indication of the separation between said pointed members as determined by the position of said pinion and said rack, the maximum effective adjustment movement of said gear rack being approximately equal to the diameter of said adjustment wheel.

2. A compass in accordance with claim 1 in which said guiding means is positioned solely within said body member.

3. A compass in accordance with claim 1 in which said gear rack member is provided with a smooth straight side opposite to the side containing the gear teeth, and in which said guiding means comprises two adjustable bearing devices arranged to engage said smooth straight side of said gear rack member at positions spaced on opposite sides of the point of engagement of said pinion gear in the direction of motion of said gear rack member.

4. A compass in accordance with claim 1 in which one of said pointed members comprises a pin having a lost motion connection with the associated supporting arm.

5. A compass in accordance with claim 4 in which said lost motion connection is with said supporting arm of said body member.

6. A compass in accordance with claim 4 including a clamping device for clamping said pin having the lost motion connection to prevent said lost motion.

7. A compass comprising a body member and a gear rack member mounted for adjustment movement within said body member and protruding therefrom, a pinion gear mounted within said body member and in engagement with said gear rack for controlling the adjustment movement of said gear rack member, each of said members including an arm and a pointed member supported on each of said arms, said pointed members each being mutually parallel and perpendicular to said rack member, an adjustment wheel substantially larger than said pinion and fixedly mounted upon a common shaft therewith for adjustment thereof, a spring friction device for restraining the rotation of said wheel to hold a desired adjustment of said rack, a graduated dial disc having a diameter substantially equal to the diameter of said wheel and arranged to be locked upon the face of said wheel to provide a direct reading indication of the separation between the points of said pointed members, said body member including an auxiliary body portion defining a slotted opening, a trammel bar mounted within said slotted opening for linear movement therein, said trammel bar including detents therein at measured intervals and said auxiliary body portion including a spring-biased detent engaging cam member for locking the position of said trammel, said pointed member supporting arm of said body member being comprised as a part of said trammel.

8. A compass comprising a body member and a gear rack member mounted for straight line adjustment movement within said body member and protruding on each side thereof, said body member including guiding means for maintaining said gear rack member in alignment therein during said movement, a pinion gear mounted within said body member and in engagement with said gear rack for controlling the adjustment movement of said gear rack member, each of said members including an arm and an adjustable pointed member supported on each of said arms, said pointed members each being mutually parallel and perpendicular to the direction of movement of said rack member, an adjustment wheel having an outside diameter greater than the diameter of said pinion and fixedly mounted upon a common shaft with said pinion for adjustment of said pinion, a constant friction locking device for restraining the rotation of said wheel and said pinion and thereby operable for holding a desired adjustment of said pinion and said rack, a graduated dial disc having a diameter substantially equal to the diameter of said wheel and adjustably positionable and arranged to be locked upon the face of said wheel to provide an accurate direct reading indication of the separation between said pointed members as determined by the position of said pinion and said rack, one of said pointed members comprising a pin having a lost motion connection with the associated supporting arm so that said compass may be operated as a drop compass, and a clamping device for clamping said pin in a fixed position so that the lost motion is discontinued, an auxiliary body portion arranged to be fastened to said body member to form a part thereof, said auxiliary body portion defining a slotted opening, a trammel bar arranged to be mounted within said slotted opening for linear movement therein, said trammel bar including detents therein at measured intervals and said auxiliary body portion including a spring-biased detent engaging cam member for locking the position of said trammel, and a pointed member supporting arm comprised as a part of said trammel, and a pin arranged to be mounted in said last-mentioned supporting arm to serve as one of said pointed members in place of said pin having a lost motion connection.

9. A compass pencil lead sharpening fixture for sharpening the pencil lead of a compass in a plane which contains a line which is perpendicular to the pencil lead and perpendicular to the dimension between the points of the compass, said fixture comprising a U-shaped body member having parallel inner surfaces precisely dimensioned to embrace the lead carrying arm of the compass, each of the legs of said U-shaped body member including slotted openings to receive and embrace the ends of the pencil lead clamping screw of the lead supporting arm of the compass, a sharpener guide member pivotally mounted to said body member, the pivot of said mounting being aligned in a direction perpendicular to the inner surfaces of said U-shaped body member, a reciprocable sharpening member slidably mounted within said sharpener guide member for linear reciprocable movement therein, said sharpening member including an abrasive surface portion arranged to engage the surface of the pencil lead to be sharpened.

10. A compass pencil lead sharpening fixture for sharpening the pencil lead of a compass of the calibrated type in a plane which contains a line which is perpendicular to the pencil lead and perpendicular to the dimension between the points of the compass, said fixture comprising a body member having parallel inner surfaces precisely dimensioned to embrace the lead carrying arm of the compass, a sharpener guide member pivotally mounted to said body member, the pivot of said mounting being aligned in a direction perpendicular to said parallel inner surfaces of said body member, a sharpening member mounted within said sharpener guide member for movement in essentially a single plane therein, said sharpening member including an abrasive surface portion arranged in a plane parallel to said plane of movement and arranged to engage the surface of the pencil lead to be sharpened.

11. A pencil compass which is calibrated to provide a direct reading of the spacing between compass points and which is capable of operation as a drop compass at point separations up to about one inch and convertible for operation as a large radius compass for point separations from one to ten inches or more, comprising a body member and a gear rack member mounted for straight line adjustment movement within said body member, a pinion gear mounted within said body member and in engagement with said gear rack member for controlling the adjustment movement thereof, each of said members including an arm for supporting an adjustable pointed member thereon, said arms being arranged to support said pointed members in positions which are mutually parallel and perpendicular to the direction of movement of said rack member within said body member, a combined adjustment wheel and direct reading adjustment dial mounted upon a common shaft with said pinion for adjustment thereof, a constant friction locking device for restraining the rotation of said wheel and said pinion for holding a desired adjustment, an auxiliary body portion arranged to be fastened to said body member for conversion of said compass to a large radius compass, said auxiliary body portion defining a slotted opening, a trammel bar arranged to be mounted within said slotted opening for linear movement therein, said auxiliary body portion including means for engaging and locking the position of said trammel bar, and a supporting arm for a pointed member comprising a part of said trammel bar, said last-mentioned supporting arm being employed to support a pin member in place of said supporting arm of said body member whenever said compass is to be employed as a large radius compass.

12. A direct-reading calibrated compass comprising a body member and a gear rack member mounted for straight line adjustment movement within said body member and protruding from two opposite sides thereof, said body member including guiding means for maintaining said rack member in alignment therein during said movement, a pinion gear mounted within said body member and in engagement with said gear rack for controlling the adjustment movement of said gear rack member, each of said members including an arm and a pointed member supported on each of said arms, an adjustment shaft journalled in said body member, said pinion being non-rotatably secured to a portion of said shaft located within said body member, said shaft having a first end extending from said body member and a second end terminated within the periphery of said body member so that only one end of said shaft extends a substantial distance beyond said body member, an adjustment wheel having an outside diameter greater than the diameter of said pinion and fixedly mounted upon said first end of said shaft, a constant friction locking device positioned upon said shaft between said wheel and said body member for restraining the rotation of said wheel and said pinion and thereby operable for holding a desired adjustment of said pinion and said rack, indicia upon a radial face of said wheel alignable with a reference mark on said body to provide an accurate direct reading indication of the separation between said pointed members as determined by the position of said pinion and said rack, wherein one of said pointed members is a pencil lead and further including a lead sharpening fixture secured to that one of said arms which supports said pencil lead, said fixture being operable to sharpen said pencil lead in a plane which contains a line which is perpendicular to the longitudinal axis of the pencil lead and perpendicular to the dimension between the points of the compass, said pencil lead supporting arm having first fixture locating means thereon, said fixture comprising a fixture body member having second locating means thereon cooperable with said first locating means to accurately position said fixture body relative to said pencil lead supporting arm, a sharpener guide member pivotally mounted to said body member, the pivot of said mounting being accurately aligned relative to said second locating means, a sharpening member mounted within said sharpener guide member for movement in essentially a single plane therein, said sharpening member including an abrasive surface portion arranged in a plane parallel to said plane of movement and arranged to engage the surface of the pencil lead to be sharpened.

References Cited by the Examiner

UNITED STATES PATENTS

| | | | |
|---|---|---|---|
| 1,345,236 | 6/1920 | Powers et al. | 33—147 |
| 1,485,600 | 3/1924 | De Bus | 33—165 X |
| 1,852,485 | 4/1932 | Sidon | 33—159 |
| 2,104,194 | 1/1938 | Glouton | 33—147 |
| 2,324,041 | 7/1943 | Suverkrop | 33—27 |
| 2,543,138 | 2/1951 | Vaughan | 33—157 |
| 2,577,159 | 12/1951 | Seferow | 33—80 |
| 2,588,499 | 3/1952 | Dubek | 120—89 |
| 2,605,747 | 8/1952 | Eakins | 120—89 |
| 3,002,280 | 10/1961 | Bennett | 33—27 |

FOREIGN PATENTS

| | | |
|---|---|---|
| 140,385 | 4/1903 | Germany. |

LEONARD FORMAN, *Primary Examiner.*

ISAAC LISANN, *Examiner.*

HARRY N. HAROIAN, *Assistant Examiner.*